Dec. 16, 1930.  G. SANTANGELO  1,785,598
SAFETY MEANS FOR MOTOR VEHICLES
Filed May 31, 1930   2 Sheets-Sheet 1

GIUSEPPE SANTANGELO
INVENTOR

BY Victor J. Evans
ATTORNEY

WITNESS:

Dec. 16, 1930.   G. SANTANGELO   1,785,598
SAFETY MEANS FOR MOTOR VEHICLES
Filed May 31, 1930   2 Sheets-Sheet 2
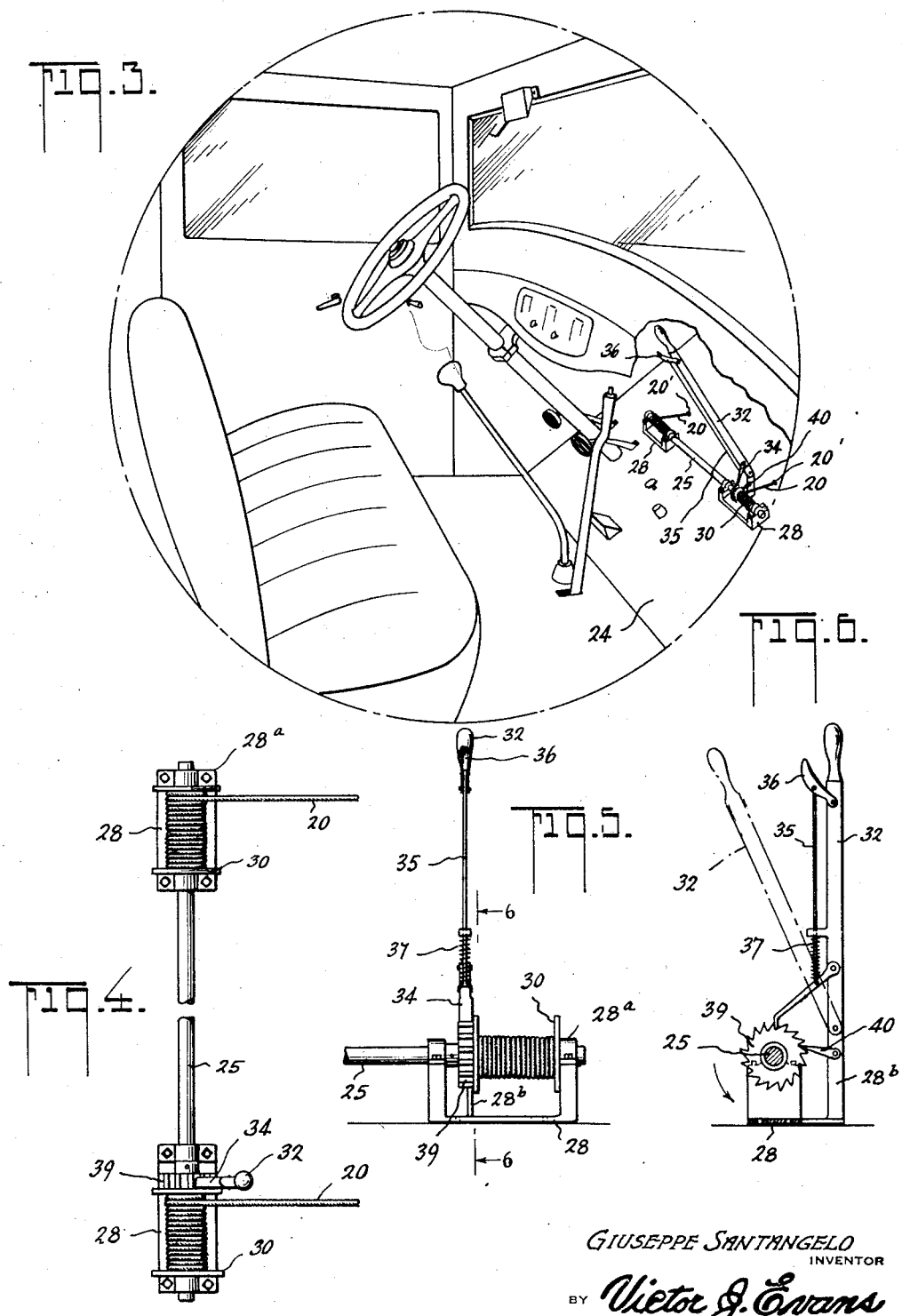
GIUSEPPE SANTANGELO
INVENTOR Patented Dec. 16, 1930

1,785,598

UNITED STATES PATENT OFFICE

GIUSEPPE SANTANGELO, OF NEW YORK, N. Y.

SAFETY MEANS FOR MOTOR VEHICLES

Application filed May 31, 1930. Serial No. 458,671.

This invention relates to safety means for motor vehicles and more particularly to fenders designed to protect careless pedestrians.

One object of the invention is to provide a fender for an automobile which, when hingedly mounted to the front portion thereof, may be normally or usually extended in horizontal position to act as a bumper for preventing injury when one car collides with another, and which, when lowered, will act as a safety device for preventing injury to a pedestrian who would otherwise be struck by the automobile or crushed under the wheels or by low-hung parts on the chassis.

Another object of the invention is to provide a device of this character which is of simple and inexpensive construction, and which may be easily and quickly operated by the driver of an automobile to prevent the wheels or the bumper thereof from striking a person in the event of a collision.

Other objects and advantages of the invention will be hereinafter specifically pointed out, or will become apparent, as the specification proceeds.

With the above indicated objects in view, the invention resides in certain novel construction and combinations and arrangement of parts, clearly described in the following specification and fully illustrated in the accompanying drawings, which latter show embodiments of the invention as at present preferred.

In said drawings:

Fig. 3 is a perspective view showing the interior of such automobile and illustrating more particularly the operating means under control of the driver, forming a feature of the invention.

Fig. 4 is a top plan view showing cable drums and winding means illustrated on a smaller scale in Fig. 3.

Fig. 5 is a elevational detail view, looking toward the left in Fig. 3.

Fig. 6 is a transverse vertical section taken on line 6—6 of Fig. 5.

Similar reference characters are applied to similar parts throughout the several views of the drawings.

Figure 1:
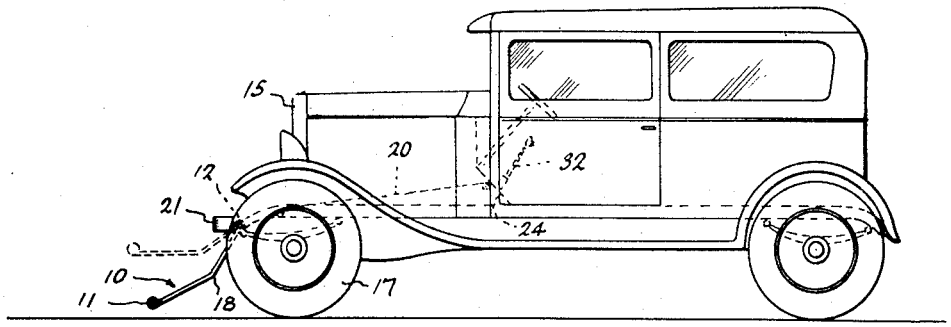
Fig. 1 is a side elevation of an automobile, showing said embodiment in full lines in lowered position, and in dot and dash lines in raised or normal position.
Figure 2:
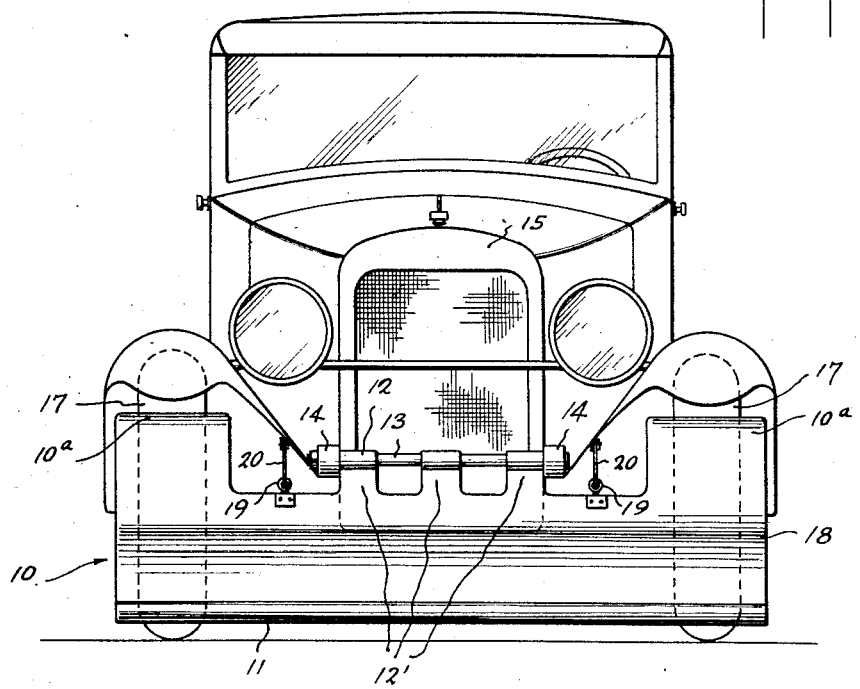
Fig. 2 is a front elevation of such automobile and embodiment.

Referring now in more detail to said drawings, a fender body or structure 10, constructed say of a steel sheet, suitably reinforced if deemed necessary, such reinforcement (not shown) then preferably being at the back or underside thereof, is shaped as seen from a comparison of Figs. 1 and 2. Desirably the front or swingable end thereof is equipped with a buffer edging 11, of say soft rubber; the opposite end of the fender carrying hinge eyes 12 by which the fender is pivotally mounted on a metal rod 13, here the usual rod joining the spring ends 14 just ahead of the radiator 15 of the automobile. It will be seen from Fig. 2 that the fender is roughly E-shaped, due to the hinge-eye carrying tongues 12', and curved extensions 10a which provide safety coverings for the fronts of the forward wheels 17. The fender 10 is longitudinally bent at 18 as shown best in Fig. 1, in order that the main portion thereof will be more nearly parallel with the roadway when elevated. Two eyes 19 secured to the fender 10 anchor the forward ends of a pair of single-stretch cables 20, which go straight back through hood and cowl and alongside the engine, to the drums shown in Figs. 3 to 6 and hereinafter described. If a front bumper 21 as shown in Fig. 1 is present, such bumper acts as a stop to hold the fender 10 in a horizontal position when elevated. In the event that the new fender is installed upon a car not already supplied with a bumper, two L-shaped metal plates (not shown) secured to the sides of the frame or otherwise, may serve as stops 5.

The cables 20 are rearwardly upwardly inclined, and as aforesaid run straight back from the eyes 19 on the opposite sides of the engine thence through suitable openings 20' (Fig. 3) in the upwardly inclined floor-board section 24 (Figs. 1 and 3).

In order to provide a means for manually raising the fender 20 and quickly lowering the same from the driver's seat, the following parts are provided:

A shaft 25 journaled in blocks 28a formed integral with base plates 28 and secured to floor-section 24, has fixed thereon twin drums 30 each having a similar wind facilitating thread as shown. Ends of cables 20 are suitably secured to these drums.

For the purpose of winding up the cables on the drums, thereby to raise the fender 10, a lever 32, is pivotally mounted to an integral extension 28b of a base-plate 28. A pawl or dog 34 is pivotally mounted on said lever 32, and is actuated by means of a rod 35 which is pivotally connected at its upper end to a release lever 36, and at its lower end to dog 34; an expansile spring 37 sleeving the lower portion of rod 35. This dog engages a ratchet 39 also fast on shaft 25. To raise the fender, the lever 32 is pulled toward the driver, the dog 34 engaging said ratchet; and this causes the shaft 25, carrying the two drums, to revolve in the direction of the arrows indicated in Fig. 6. On the driver next forwardly thrusting lever 32 away from him, the spring 37 permits the dog 34 to click idly back over the ratchet, the latter meanwhile being held fast by a second dog 40. Relatively few of such back and forth movements of the lever 32 will wind sufficient cable on the drums to raise the fender 10 to the desired horizontal position. As just explained the dog 40 engages the ratchet 39 while the latter is being turned by the lever, and so as to prevent said ratchet from turning in the opposite direction in response to the weight of the fender. When the fender has been elevated to the desired position, the dog 40 may be manually flipped away from the ratchet to free the fender to drop, instantly and automatically, by its own mere weight.

The fender, when in its elevated position, may serve as a bumper for the automobile; the fender being prevented from rising above the horizontal position by means of the stops described hereinabove, and being suspended at the desired height by means of the cables and the wound-up condition of the drums. While the automobile is in motion, and when the driver sees a pedestrian in front of the car in a position of imminent peril, he may instantly throw the fender to protective position, as already described. A suitable pedal mechanism (not shown) may be provided, if desired, for raising the dog 40, thereby to release the ratchet 39 more quickly than could be done by hand.

The hereinbefore described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

I claim:

1. A vehicle safety fender including a plate structure hingedly mounted on the front end of an automobile, a resilient buffer on the front portion of said structure, a shaft mounted on the upwardly inclined pedal section of the floor board of the automobile, a plurality of drums fixedly carried by said shaft, a plurality of cables for raising and lowering said fender, said cables being secured at one end to the fender and at their opposite ends to said drums, a ratchet wheel carried by said shaft, a dog to engage said ratchet and a lever to actuate said dog for raising said plate member.

2. A vehicle safety fender including a fender hingedly mounted on the front end of an automobile, hinge eyes integral with said plate for mounting same, a shaft mounted on the upwardly inclined pedal section of the floor board of the automobile, a plurality of drums fixedly carried by said shaft, a plurality of cables for raising and lowering said fender, said cables being secured at one end to the fender and at their opposite ends to said drums, a ratchet wheel fixedly carried by said shaft, a lever carrying a dog for engaging said ratchet, providing means for turning said drums thereby to raise said fender, and a second dog for preventing reverse rotation of said ratchet, said second dog being pivotally mounted for quick disengagement from the ratchet.

3. In a vehicle safety fender, a fender made from a single substantially E-shaped piece of sheet metal and including a plurality of hinge eyes for hingedly mounting said structure to the front of an automobile, and extension portions in the upper side thereof to guard the front wheels of said automobile, and means for raising and lowering said plate including straight-stretched cables from the fender to the operator's compartment.

4. In a vehicle safety fender, the combination of a metal sheet structure hingedly mounted on the front tie-bar joining the front spring structures of the automobile, said sheet structure having upward extensions at the sides thereof for guarding the upper portion of the front wheels of an automobile, a pair of cables engaging and for raising said sheet structure, and simultaneously revoluble drums inside the automobile for taking up said cables and raising said sheet structure.

In testimony whereof I hereby affix my signature.

GIUSEPPE SANTANGELO.